Patented Dec. 21, 1937

2,103,188

UNITED STATES PATENT OFFICE 2,103,188

ANTIOXIDANT

Waldo L. Semon, Silver Lake, and Robert V. Yohe, Cuyahoga Falls, Ohio, assignors to The B. F. Goodrich Company, New York, N. Y., a corporation of New York No Drawing. Application September 9, 1936, Serial No. 100,034

19 Claims. (Cl. 18—50)

This invention relates to the art of preserving rubber, fatty oils, cracked gasoline and other petroleum products, synthetic plastics, and other organic materials which tend to deteriorate by absorption of oxygen from the air from unduly rapid deterioration due to oxidation and the like.

We have discovered that a new class of compounds is very effective as an antioxidant. These compounds have the general structural formula:

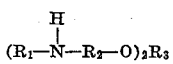

where $R_1$ represents an aryl radical, $R_2$ represents an arylene radical, and $R_3$ represents a bivalent radical selected from the class consisting of alkylene or aralkylene hydrocarbon radicals and dialkyl ether radicals. Aralkylene radicals are composed of an aromatic nucleus and an alkylene side-chain. Typical members of this new class of compounds include 1,2-bis-p-anilinophenoxy ethane; 1,1-bis-p-(p-tolylamino)phenoxy ethane; 1,2-bis-$\alpha'$-(p-xenylamino)$\beta$-naphthyloxy n-pentane; bis-$\beta$-(p-xylylamino)$\alpha$-naphthyloxy methane; phenyl bis-(p-anilinophenoxy) methane; $\beta,\beta'$-bis-(p-anilinophenoxy) diethyl ether; $\gamma,\gamma'$-bis-(p-xylylaminophenoxy) di-n-propyl ether. Though the para position is preferred, ortho or meta positions may be selected on radicals like xylyl. The radicals selected for illustrative purposes may be replaced by their homologues. Any of these compounds may be used as antioxidants by incorporating a small amount, usually from 0.2 to 100 parts by weight in 100 parts of rubber. For fatty oils, petroleum products, and other organic materials, very small amounts may prove satisfactory. In cracked gasoline, for instance 0.005% by weight of the antioxidant is usually enough.

As a specific example of one embodiment of the method of this invention, 1,2-bis-p-anilinophenoxy ethane having the structural formula

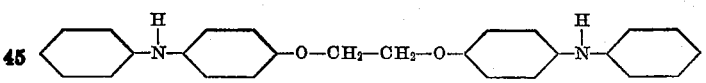

was prepared. 37 parts by weight of p-hydroxydiphenylamine in an alcoholic alkali solution containing 600 parts by volume of alcohol and 130 parts by weight of potassium hydroxide were refluxed for three hours with 188 parts by weight of ethylene bromide. The reaction was quite vigorous. 1,2-bis-p-anilinophenoxy ethane which had a melting point of 159°–160° C. was isolated from the reaction mixture. It crystallized in white, fluffy crystals which, when pure, did not darken in light or air.

To test the efficacy of this material as an antioxidant, a typical white rubber stock was prepared containing blended plantation rubbers 100 parts by weight, lithopone 92 parts, zinc oxide 32 parts, ultramarine blue 0.35 part, paraffin wax 1.15 parts, sulfur 3.0 parts and aldehyde-amine accelerator 0.173 part. One part of this was used as a control. To another part was added 1.0 part by weight (0.44% of the composition) of 1,2-bis-p-anilinophenoxy ethane. The compositions were thoroughly mixed, and vulcanized for 45 minutes at 280° F. to produce an optimum cure. The vulcanized compositions were tested to compare their relative rates of aging by measuring their tensile strength before and after aging. It was found that after aging, the stock which contained no antioxidant possessed only one half to one tenth of the tensile strength of the stock containing 1,2-bis-p-anilinophenoxy ethane, depending upon the method by which the stocks were aged. It is evident that 1,2-bis-p-anilinophenoxy ethane is a very effective antioxidant. In addition to this property, it shows very little tendency to discolor or stain the material in which it is used, making it an especially valuable compound for use as an antioxidant where the color of the product is an important consideration.

Similar excellent results can be obtained by substituting any other member of this new class, such as 1,2-bis-p-anilinophenoxy propane, phenyl bis-(p-anilinophenoxy)methane, or $\beta,\beta'$-bis-(p-anilinophenoxy) diethyl ether. It is to be clearly understood that this class of compounds may be used not only in rubber stocks other than that mentioned for specific illustration, but also in materials other than rubber, for it is useful in petroleum products, fatty oils, synthetic plastics, and other materials in which antioxidants are used.

It is to be understood that the term "treating" is employed in the appended claims in a generic sense to include either the incorporation of the antioxidants into the rubber or the like by mixing them into the said material while it is in a plastic or fluid condition, or by applying them in the form of a paste, powder, or solution to the surface of a solid mass thereof. The term "rubber" is likewise employed in the claims in a generic sense to include caoutchouc, both natural and synthetic, balata, gutta-percha, rubber isomers, and like products, whether or not admixed with fillers, pigments, or vulcanizing or accelerating agents.

It is to be understood that the scope of this invention is not to be limited by the method of preparation or materials used for illustrative purposes, for it is susceptible of numerous modifications in its various parts without exceeding the spirit and scope of the invention as defined in the appended claims.

We claim:

1. The method of retarding the deterioration of an organic substance which tends to deteriorate by absorption of oxygen from the air which comprises treating the said substance with a compound having the general structural formula:

where $R_1$ represents an aryl radical, $R_2$ represents an arylene radical, and $R_3$ represents a bivalent radical selected from the class consisting of alkylene and aralkylene hydrocarbon radicals and dialkyl ether radicals.

2. The method of preserving rubber which comprises treating rubber with a compound having the general structural formula:

where $R_1$ represents an aryl radical, $R_2$ represents an arylene radical, and $R_3$ represents a bivalent radical selected from the class consisting of alkylene and aralkylene hydrocarbon radicals and dialkyl ether radicals.

3. The method of retarding the deterioration of an organic substance which tends to deteriorate by absorption of oxygen from the air which comprises treating the said substance with a bis-arylaminoaryloxy alkane.

4. The method of preserving rubber which comprises treating rubber with a bis-arylaminoaryloxy alkane.

5. A rubber composition comprising rubber and a small proportion of a bis-arylaminoaryloxy alkane.

6. The method of preserving rubber which comprises treating rubber with a bis-arylaminoaryloxy aryl substituted alkane.

7. A rubber composition comprising rubber and a small proportion of a bis-arylaminoaryloxy aryl substituted alkane.

8. The method of preserving rubber which comprises treating rubber with a bis-arylaminoaryloxy dialkyl ether.

9. A rubber composition comprising rubber and a small proportion of a bis-arylaminoaryloxy dialkyl ether.

10. The method of retarding the deterioration of an organic substance which tends to deteriorate by absorption of oxygen from the air which comprises treating the said substance with 1,2-bis-p-anilinophenoxy ethane.

11. The method of preserving rubber which comprises treating rubber with 1,2-bis-p-anilinophenoxy ethane.

12. A rubber composition comprising rubber and a small proportion of 1,2-bis-p-anilinophenoxy ethane.

13. A rubber composition which has been vulcanized in the presence of 1,2-bis-p-anilinophenoxy ethane.

14. The method of preserving rubber which comprises treating rubber with phenyl bis-(p-anilinophenoxy) methane.

15. A rubber composition comprising rubber and a small proportion of phenyl bis-(p-anilinophenoxy) methane.

16. A rubber composition which has been vulcanized in the presence of phenyl bis-(p-anilinophenoxy) methane.

17. The method of preserving rubber which comprises treating rubber with $\beta$, $\beta'$-bis-(p-anilinophenoxy) diethyl ether.

18. A rubber composition comprising rubber and a small proportion of $\beta$, $\beta'$-bis-(p-anilinophenoxy) diethyl ether.

19. A rubber composition which has been vulcanized in the presence of $\beta$, $\beta'$-bis-(p-anilinophenoxy) diethyl ether.

WALDO L. SEMON.
ROBERT V. YOHE.